Nov. 7, 1961 W. R. LONG 3,007,475
PEANUT COMBINE
Original Filed June 12, 1958 4 Sheets-Sheet 1

INVENTOR
W. R. LONG
BY
ATTORNEY

Nov. 7, 1961
W. R. LONG
3,007,475
PEANUT COMBINE
Original Filed June 12, 1958
4 Sheets-Sheet 2
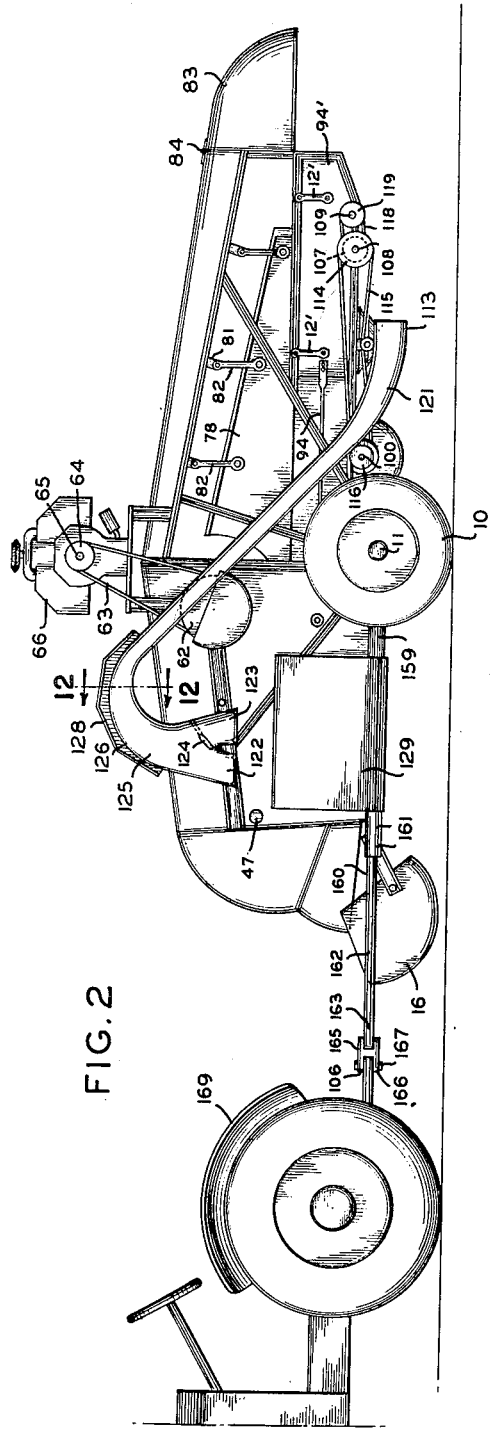
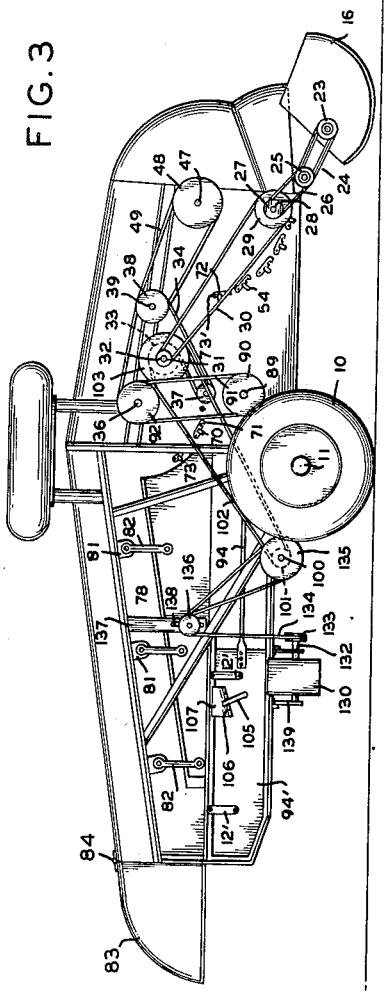
INVENTOR
W. R. LONG
BY
ATTORNEY Nov. 7, 1961  W. R. LONG  3,007,475
PEANUT COMBINE Original Filed June 12, 1958  4 Sheets-Sheet 3

INVENTOR
W. R. LONG

BY
ATTORNEY

Nov. 7, 1961 W. R. LONG 3,007,475
PEANUT COMBINE

Original Filed June 12, 1958 4 Sheets-Sheet 4

INVENTOR
W. R. LONG

BY *(signature)*
ATTORNEY

3,007,475
PEANUT COMBINE
William Redden Long, Tarboro, N.C., assignor to Long Manufacturing Company, Tarboro, N.C.
Original application June 12, 1958, Ser. No. 741,665. Divided and this application Mar. 2, 1960, Ser. No. 12,435
8 Claims. (Cl. 130—30)

This invention relates to agriculture or the cultivation of the soil and to machinery employed in the pursuit thereof, specifically to agricultural machinery or the like employed in the gathering of vines with fruit thereon, and to the separation cleaning and collection of such fruit free of the vines in bags or other containers.

This invention is a division of my copending application Serial No. 741,665 for a Peanut Combine and is concerned particularly with the collection of peanut vines, the detachment of the peanuts therefrom, the cleaning of the peanuts and removal of short stems and finally the collection of the peanuts in suitable containers.

Machines employed for the threshing or picking of peanuts from the vines on which they have grown have employed relatively long conveyors requiring substantial space for their accommodation and rendering these machines bulky, cumbersome, heavy and expensive. Likewise these machines have lacked durability, were costly to operate and maintain, and they did not clean in the best possible manner.

It is an object of the invention to provide a peanut picker or combine which will pick up peanut vines with the nuts thereon directly from the ground or windrow without a separate conveyor, will separate peanuts from the vines to which they are attached, will remove the stems as well as clean the peanuts, and will discharge them into suitable bags or other containers.

Another object of the invention is to provide a machine in the form of a trailer capable of being attached to a towing vehicle centrally or at either side of the same to make it possible to use the same to a maximum degree with only a minimum investment in the machine.

Figure 1:
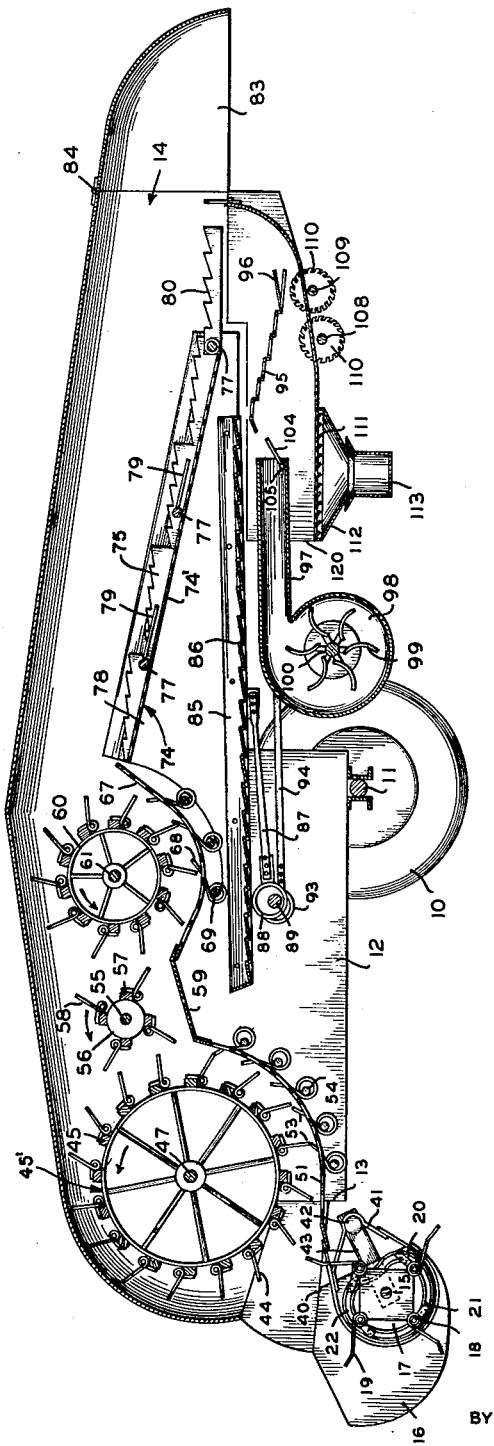
Figure 4:
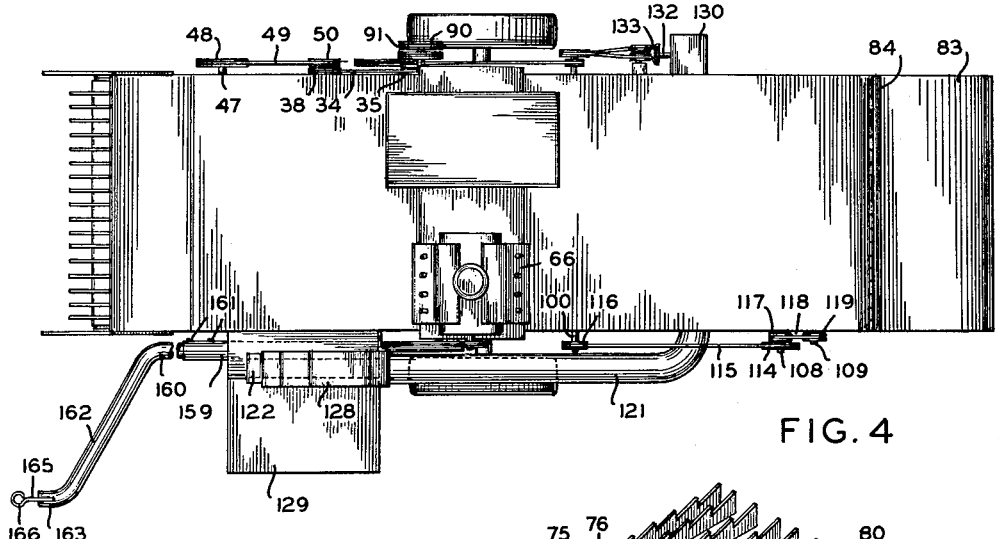
Figure 5:
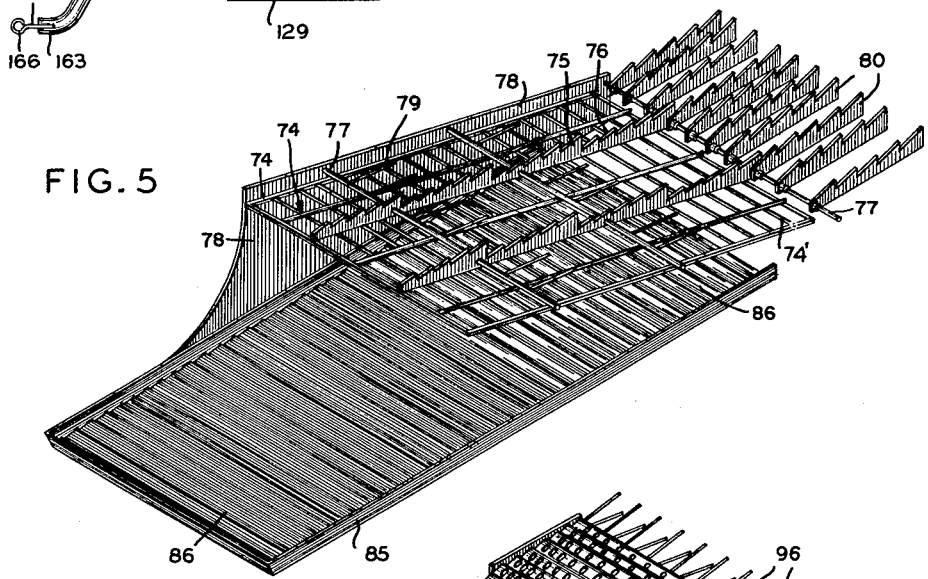
Figure 6:
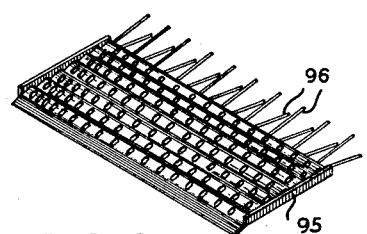
Figure 12:
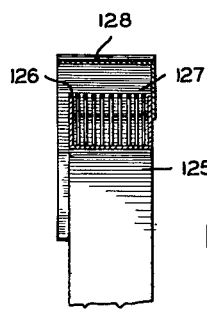
Figure 7:
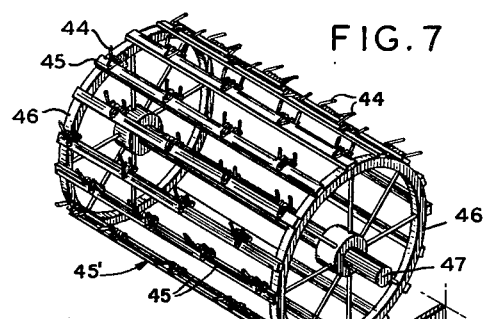
Figure 11:
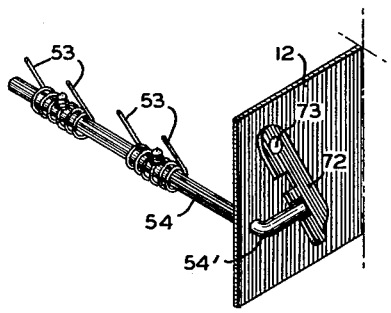
Figure 8:
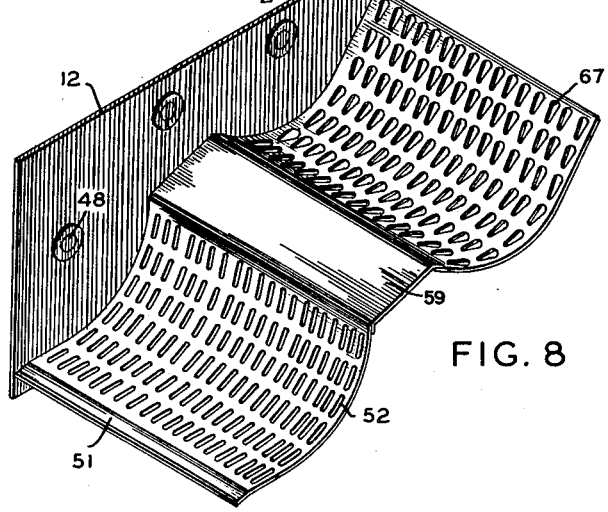
Figure 9:
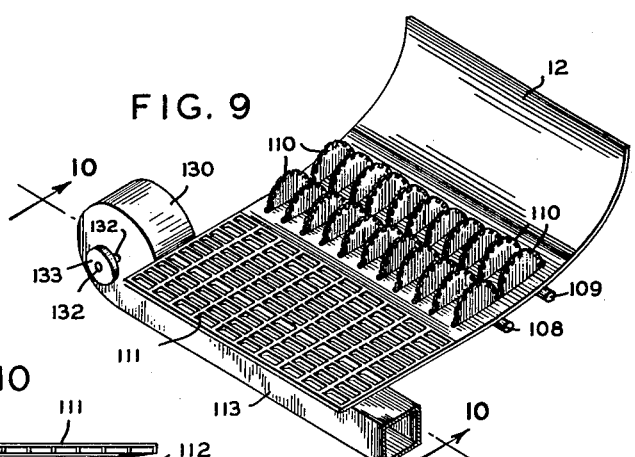
Figure 10:
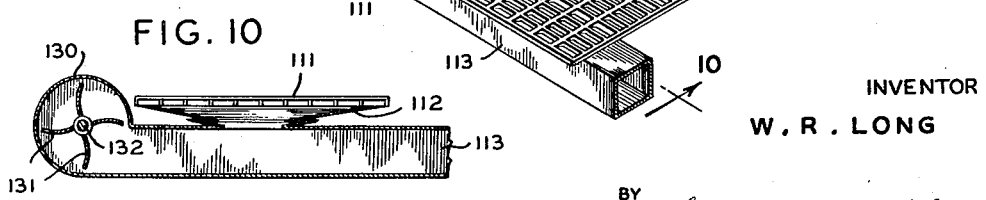

Other objects and advantages of the invention will be apparent from the following description taken in conjunction with the accompanying drawings wherein:

FIG. 1 is a longitudinal vertical section on a reduced scale substantially along the center line of a peanut combine illustrating one application of the invention;

FIG. 2, a left side elevation;

FIG. 3, a right side elevation;

FIG. 4, a top plan view;

FIG. 5, an enlarged detailed perspective of the vine and nut moving mechanism;

FIG. 6, an enlarged fragmentary detailed perspective of the vine and nut separating grating;

FIG. 7, a perspective of one of the threshing cylinders;

FIG. 8, a perspective of the breast plate;

FIG. 9, a fragmentary detailed perspective of the destemming knives, grill and blower mechanism;

FIG. 10, a section on the line 10—10 of FIG. 9;

FIG. 11, an enlarged fragmentary perspective of one of the shafts which support the stripping fingers and including an adjustable positioning lever for such shaft; and FIG. 12, a section on the line 12—12 of FIG. 2.

Briefly stated, the invention comprises a relatively simple compact structure including a series of cylinders, a breast plate, separate means for receiving and independently advancing the vines and the peanuts, and blower means for cleaning and separating dust and trash from the peanuts, as well as bags for separately collecting the peanuts.

The first of the cylinders has spring fingers which pick up or engage and elevate the vines slightly into contact with the spring fingers of a second cylinder which carries them along the adjacent concave slotted surface of the breast plate through the slots of which additional spring fingers project and maintain the progress of the vines. Subsequently the vines are engaged by the spring fingers of a smaller cylinder and moved across a flat imperforate intermediate portion of the breast plate. The vines then are engaged and further elevated while the peanuts are stripped therefrom and fall though openings in a second concave portion of the breast plate onto a pan from which they are discharged and collected separately. The peanuts leaving the pan are subjected to fanning to separate the chaff and light particles therefrom and the vines and chaff are discharged from the rear of the machine while the peanuts are discharged through a separate opening to the exterior and collected in bags or other suitable containers.

With continued reference to the drawings, the machine of the present invention comprises wheels 10 mounted on an axle 11 on which is supported a housing 12 having an inlet 13 and an outlet 14.

A pick-up for peanut vines with nuts attached is provided in the form of a shaft 15 journaled in spaced plates 16 and with a substantially rectangular plate 17 fixed to said shaft, one adjacent each of said spaced plates and forming supports for a series of rods 18 connecting corresponding corners of the plates and provided with vine engaging spring fingers 19 which engage and pick up the peanut vines. The rods 18 are provided with crank arms 20 having pins 21 located within and following the cam grooves 22 along the inside faces of the plates 16.

The shaft 15 is provided on one end with a pulley 23 (FIG. 3) driven by a belt 24 from a double pulley 25 driven by a belt 26 from a pulley 27 on a shaft 28. The shaft 28 has attached thereto a larger pulley 29 driven by a belt 30 from a pulley 31 on a shaft 32. The shaft 32 is driven by a pulley 33 from a belt 34 and a pulley 35 on a shaft 36.

The belt 34 extends about an idler pulley 37 supported on the housing 12 and also extends about the pulleys 33, 35 (FIG. 4) and 38 on the shaft 39.

Between the spring fingers 19 are mounted a series of curved bands 40 attached to supports 41 carried by a shaft 42 supported at its ends between plates 43, one at each end. The vines will be engaged and picked up by spring fingers 19 and will be carried into engagement with spring fingers 44 on spaced bars 45 mounted on a threashing cylinder 45' composed of spaced wheels 46 supported on a shaft 47 and driven by a pulley 48 and a belt 49 from a pulley 50 (FIG. 4) on shaft 39.

The threashing cylinder rotates in a counter-clockwise direction to carry the vines rearwardly onto a breast plate 51 (FIGS. 1 and 8) having slots 52 through which spring fingers 53 project and through which dirt can fall. The spring fingers 53 are mounted on shafts 54 and are adapted to separate the peanuts from the vine as well as prevent the vine from falling back as it is advanced and elevated along the breast plate.

The vines are carried along the breast plate with the peanuts knocked loose or detached therefrom until the vines and the detached peanuts carried thereby reach the rear of the threshing cylinder where they are stripped therefrom by a stripper cylinder including a shaft 55 having a disk 56 at each end on which are mounted bars 57 carrying spring fingers 58. The spring fingers 58 travel in a counter-clockwise direction opposite the travel of the periphery of the threshing cylinder stripping the vines therefrom and carrying them with the peanuts either on the vine or stripped therefrom over the imperforate central portion 59 of the breast plate 51 after which the nuts may drop through openings in the rear portion of the breast plate as will be presently described. The vines are removed from the stripper cylinder by means of a second threshing cylinder 60 similar to the threashing and stripper cylinders mounted on the shafts 47 and 55.

The threshing cylinder 60 is mounted on a shaft 61 having a pulley 62 (FIG. 2) driven by a belt 63 from a pulley 64 on the shaft 65 of an internal combustion engine 66. The rear concave portion of the breast plate is porvided with pear-shaped openings 67 through which the peanuts fall. A plurality of spring fingers 68 are mounted on cross rods 69 and these spring fingers extend through the pear-shaped openings 67 and shake loose any peanuts still clinging to the vines and prevent the vines from falling back as they are carried upwardly from the breast plate. The pear-shaped openings assist in detaching peanuts from their stems.

The shafts 54 and 69 are provided with upturned ends 54' and 70 and are selectively applicable to a series of notched bars 71 and 72 mounted on pivots 73 and 73' (FIGS. 3 and 12). This permits the adjustment of the spring fingers 53 and 68 and the amounts they extend above the breast plate.

The vines carried beyond the breast plate, pass onto a vine rack 74 where any nuts left on the vines are detached. This vine rack consists of a grid 74' having a pair of rib forming strips 75 provided with groups of angularly disposed serrated edges 76 adapted to engage and cause movement of the vines on said rack. The rack is mounted by means of rods 77 having their ends journaled in side members 78. The first two of the members 77 are provided with spaced rearwardly disposed vine engaging fingers 79 adapted to move from a prone to a somewhat raised position and on the rear transverse rods 77 are mounted a series substantially parallel serrated members 80 which engage and cause the discharge of the vines from the rack.

The rack is suspended within the housing by means of depending brackets 81 to which are pivoted links 82 attached to the rods 77, such links 82 being fixed to the first two of such rods 77 by means of a set screw or the like so that the fingers 79 will be caused to swing in an arc from a lower to a somewhat raised position due to the fact that they are carried by the rods 77.

The smaller rack is pivoted to the larger rack in order to be moved to eject the vines, the vines being discharged through the discharge outlet 14 to the exterior.

The discharge outlet 14 may be provided with a hood or extension 83 curved to deflect the vines earthward, such hood being attached to the housing 12 by a hinge 84 or any other desired means for securing the hood in fixed position.

Peanuts passing through the openings 67 in the rear portion of the breast plate 51 will be caught in a pan 85 having a washboard type bottom 86 with ribs tapered to provide shoulders. The pan 85 is carried by the side members 78, which is rapidly reciprocated by means of a connecting rod 87 connected to an eccentric 88 mounted on a shaft 89 (FIGS. 1 and 3) rotated by a double pulley 90 driven by a pair of belts 91 from a double pulley 92 from the shaft 36. A pair of eccentrics 93 also are rotated by the shaft 89 and are connected to a pair of connecting rods 94 the opposite ends of which are connected to a pair of side plates 94' which are suspended from the framework of the machine by pivoted links 12'.

The connecting rods 94 cause the side plates 94' to reciprocate and consequently vibrate a screen 95 mounted therebetween similar to the pan 85 but smaller and with holes therethrough to let the peanuts fall downwardly and air to flow upwardly through and around the same to blow vines, dirt, small rocks and trash out of the rear end of the machine. The rear extremity of the member 95 is provided with tines or screen fingers 96 to direct stems and light material into position to be blown from the machine by means of air under pressure from the discharge end 97 of a blower 98, air pressure being produced by vanes 99 carried by a shaft 100, such shaft being provided with a pulley 101 (FIG. 3) driven by a belt 102 from a pulley 103 mounted on and driven by the shaft 32. The discharge end 97 of the blower 98 is provided with an adjustable valve or baffle member 104 mounted on a shaft 105, the end of which is turned upwardly and fits in the notches in a flange 106 on a bracket 107 so that it may be maintained in adjusted position.

Beneath the housing 12 at the rear of the machine are mounted a pair of shafts 108 and 109 on each of which is mounted a series of stemmer knives or saws 110 which project through the bottom of the machine for detaching the stems from peanuts discharged through the perforated screen 95 so that air from the blower 98 may blow the detached stems through the discharge opening 14. The peanuts being heavier slide forwardly down the incline of the bottom and fall by gravity through a grill 111 in the forward end of the bottom of the housing 12 and then through a flared connection or funnel 112 into a discharge pipe 113.

The shaft 108 is driven by a pulley 114 which is driven by belt 115 from pulley 116 mounted on the shaft 100. The shaft 108 also is provided with pulley 117 which drives belt 118 and pulley 119 mounted on the shaft 109.

Foreign substances such as relatively large rocks or other heavy objects will pass over the grill and be discharged through the opening 120 at the rear of the grill 111. Peanuts dropping into the pipe 113 will be discharged through a conveyor tube 121 to discharge openings 122 or 123 depending upon the position of an adjustable valve 124. This permits the peanuts to be discharged through the discharge opening 122 until the bag suspended beneath the opening 122 can be filled at which time the valve 124 may be moved to divert or direct the peanuts through the discharge 123 to fill another bag suspended thereunder alternately during the use of the machine. The conveyor tube 121 includes an elbow 125 with an opening 126 providing an air vent and having spaced rods 127 for preventing the discharge of peanuts therethrough covered by a shield 128 so that dirt carried up through the tube will not be discharged into the bags. At the same time, this opening reduces the air pressure so that the peanuts are handled gently without injury. Below the discharge openings 122 and 123 is a platform 129 on which an operator and the bags to be filled may be supported.

Air for the pipe 113 is under pressure from a blower 130 having vanes 131 mounted on a shaft 132 which is driven by a pulley 133 driven by a belt 134 which in turn is driven by the pulley 135 attached to the shaft 100 (FIG. 3). An adjustable double pulley 136 is disposed between pulley 133 and pulley 135 on a bracket 137 having a slot 138 for adjusting the tension on the belt 134 and for changing the direction of the driving force from transverse to longitudinal. The blower shaft 132 is journaled in a pair of brackets 139 attached to the underside of the housing 12.

It will be apparent that the spring fingers of the cylinders 47, 55 and 61 preferably are yieldable rearwardly when they engage the vines to thereby avoid the vines being retained thereon sufficiently to clog the machine. The shape of the breast plate and associated parts directs the movement of the vines with the attached and unattached fruit, the openings 67 permitting the fruit to drop onto the pan 85 while the vines pass onto the vine rack 74.

The vine rack is relatively wide and long and is notched or serrated so that when it reciprocates it will cause the vines to be advanced down the rack, the flippers 79 cooperating toward such end. The pan 85 likewise is relatively wide and long and is provided with ribs which engage the peanuts and distribute them over the pan as well as advance them endwise upwardly along and from the pan due to the reciprocatory movement provided by the connection 87 with the eccentric 88 on the shaft 89.

The peanuts are discharged on the screen 95 where they are subjected to air from the blower 100, screen fingers or tines 96 serving to direct straw or foreign matter into the air stream so that it can be blown through the opening 14 from the rear of the machine. After the peanuts are past the screen 95 they will pass through the grill 111 and down the inclined or flared walls 112 into the transverse pipe 113 merging with the gentle curvature into the air lift having the openings in its upper portion.

The present invention is compact due to the particular construction and arrangement of parts including the downwardly inclined surface area connected centrally with the air lift to thus reduce the overall height required and which is considerably less than it would be if there were a single elongated delivery chute. The combination of the pick-up or gathering device which engages peanuts directly on the windrow, the threshing and transfer cylinders, the multiple stage cleaning including the screen and the air lift with a grill in the upper portion of the air lift having openings small enough to prevent peanuts being carried therethrough but large enough to allow dirt, trash and other foreign matter to pass out with the air so that the peanuts may fall gently into collection receptacles without breakage.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. In a peanut combine having means for elevating peanut vines with peanuts attached and for separating the peanuts from the vines, a housing, vine discharging means for discharging the vines from the rear of said housing, a stepped pan mounted in said housing and adapted to evenly spread the peanuts and move the same toward the rear of the machine, a stepped screen mounted in said housing below the discharge end of said pan for receiving peanuts from said pan, the openings in said screen being of a size to permit the peanuts to fall therethrough, a blower adapted to blow air through said screen to separate pieces of vine, dirt and trash from the peanuts, a connecting member located beneath said housing into which peanuts may fall by gravity, a peanut discharge pipe associated with said connecting member exteriorly of said housing and having a portion inclined upwardly and terminating in multiple discharge openings, a second blower on one end of said discharge pipe and adapted to blow the peanuts up said inclined portion and through said discharge openings, and an air vent at the top of said inclined portion having means for reducing the air pressure so that the peanuts may be collected in bags without injury.

2. In a peanut combine having means for elevating peanut vines with peanuts attached and for separating the peanuts from the vines, a housing, vine discharging means for discharging the vines from said housing, means adapted to receive the peanuts after they have been separated from the vines and to move the same in the machine, a screen for receiving the peanuts from the end of said peanut moving means, a blower adapted to blow air over said screen to clean said peanuts, a flared member lower than said screen whereby peanuts may fall by gravity from said screen into a discharge pipe in a minimum amount of space, a peanut discharge pipe operatively associated with said flared member having a portion inclined upwardly and terminataing in a discharge opening, and means for moving the peanuts through said discharge pipe and through said discharge opening.

3. The structure of claim 2 in which said last mentioned means comprises a second blower.

4. The structure of claim 2 in which said screen has a plurality of tines to aid in cleaning said peanuts.

5. In a peanut combine of low overall height and including means for separating the peanuts from the vines and for causing the peanuts and vines to pass through the machine, the improvement of an inclined screen onto which the peanuts are discharged, said screen having openings of a size through which the peanuts can fall, a blower having a discharge for directing air against said screen for separating foreign matter from the peanuts, a discharge pipe having one end open to receive peanuts from said screen, a conveyor tube connected to said discharge pipe and extending upwardly at an angle and with a depending discharge extremity, said tube being provided with air venting means at its upper portion for the discharge of foreign matter and the release of air pressure whereby peanuts will be subjected to reduced air pressure upon their discharge.

6. The structure of claim 5 in which said discharge extremity has multiple discharge openings, and valve means for selectively directing the discharge through said openings.

7. In a peanut combine a downwardly inclined screen on which the peanuts are adapted to be received, said screen having openings of a size to allow the peanuts to fall therethrough, a blower for producing flow of air over said screen for removing foreign matter from the peanuts, a generally horizontally disposed discharge pipe located below said screen and extending laterally therefrom, a connection providing an inlet into one end portion of said discharge pipe through which peanuts falling through said screen are received, a conveyor tube connected to the other end portion of said discharge pipe, said conveyor tube extending upwardly at an angle and having a curved end portion terminating in a depending discharge extremity, and air venting means in the upper portion of said conveyor tube for the discharge of foreign matter and the release of air pressure whereby the peanuts will be subjected to reduced air pressure as they are discharged from the conveyor tube through said depending discharge extremity.

8. In a peanut combine a downwardly inclined screen on which the peanuts are adapted to be received, said screen having openings of a size to allow the peanuts to fall therethrough, a blower for producing flow of air over said screen for removing foreign matter from the peanuts, a generally horizontally disposed discharge pipe located below said screen and extending laterally therefrom, a connection providing an inlet into one end portion of said discharge pipe through which peanuts falling through said screen are received, a conveyor tube connected to the other end portion of said discharge pipe, said conveyor tube extending upwardly at an angle and having a curved end portion terminataing in a depending discharge extremity, and air venting means in the upper portion of said conveyor tube for the discharge of foreign matter and the release of air pressure whereby the peanuts will be subjected to reduced air pressure as they are discharged from the conveyor tube through said depending discharge extremity, said discharge extremity having multiple discharge openings and valve means for selectively directing the discharge through said openings.

References Cited in the file of this patent

UNITED STATES PATENTS

| | | |
|---|---|---|
| 671,402 | Schuman | Apr. 2, 1901 |
| 1,081,593 | Eisenhart | Dec. 16, 1913 |
| 1,744,906 | Livermon | Jan. 28, 1930 |
| 2,395,163 | Carroll | Feb. 19, 1946 |
| 2,746,808 | Stricker | May 22, 1956 |
| 2,856,936 | Landrum et al. | Oct. 21, 1958 |

FOREIGN PATENTS

| | | |
|---|---|---|
| 177,004 | Austria | Dec. 28, 1953 |